US012794772B2

(12) United States Patent
Cai et al.

(10) Patent No.: US 12,794,772 B2
(45) Date of Patent: Nov. 10, 2026

(54) SYSTEMS AND METHODS FOR REDUCED BANDWIDTH COMMUNICATIONS USING ARTIFICIAL INTELLIGENCE/MACHINE LEARNING (AI/ML) MODELS

(71) Applicant: T-MOBILE INNOVATIONS LLC, Overland Park, KS (US)

(72) Inventors: Zheng Cai, Fairfax, VA (US); Zheng Fang, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 92 days.

(21) Appl. No.: 18/920,200

(22) Filed: Oct. 18, 2024

(65) Prior Publication Data

US 2026/0113238 A1 Apr. 23, 2026

(51) Int. Cl.

| | |
|---|---|
| ***H04L 41/0823*** | (2022.01) |
| ***G06N 3/08*** | (2023.01) |
| ***G06N 3/09*** | (2023.01) |
| ***H04L 41/16*** | (2022.01) |
| *G06N 20/00* | (2019.01) |

(52) U.S. Cl.

CPC ........... *H04L 41/0823* (2013.01); *G06N 3/08* (2013.01); *G06N 3/09* (2023.01); *H04L 41/16* (2013.01); *G06N 20/00* (2019.01)

(58) Field of Classification Search

CPC ................................................... H04L 41/0823

See application file for complete search history.

(56) References Cited

U.S. PATENT DOCUMENTS

| | | | | |
|---|---|---|---|---|
| 9,990,574 | B2 * | 6/2018 | Strong | G06K 19/07743 |
| 10,356,128 | B1 * | 7/2019 | Lango | H04L 63/0263 |
| 2017/0359082 | A1 * | 12/2017 | Riedel | H04B 1/16 |
| 2020/0234725 | A1 * | 7/2020 | Garbacea | G10L 25/30 |
| 2022/0060235 | A1 * | 2/2022 | Namgoong | G06N 3/088 |
| 2023/0344705 | A1 * | 10/2023 | Amini | G06V 20/41 |
| 2026/0075341 | A1 * | 3/2026 | Smith | G06N 3/0455 |

* cited by examiner

*Primary Examiner* — Aftab N. Khan
(74) *Attorney, Agent, or Firm* — Shook, Hardy & Bacon L.L.P.

(57) ABSTRACT

Systems and methods for reduced bandwidth communication using AI/ML models are provided. A system may include a first apparatus and a second apparatus that communicate via a telecommunications network. The first apparatus may generate vector(s) from data using model(s) that apply one or more first processes to the data and transmit the vector(s) to a first component of the telecommunications network. The first apparatus may also provide an indication of the one or more first processes applied by the model(s) to the data. The second apparatus may receive the vector(s) from a second component of the telecommunications network and receive an indication of the one or more first processes applied by model(s) used to generate the vector(s) from the data. The second apparatus may recover the data from the vector(s) using model(s) that apply one or more second processes to the vector(s) that reverse the one or more first processes.

18 Claims, 5 Drawing Sheets

SYSTEMS AND METHODS FOR REDUCED BANDWIDTH COMMUNICATIONS USING ARTIFICIAL INTELLIGENCE/MACHINE LEARNING (AI/ML) MODELS

SUMMARY

The present disclosure is directed, in part, to reduced bandwidth communications substantially as shown in and/or described in connection with at least one of the figures, and as set forth more completely in the claims.

A high-level overview of various aspects of the present technology is provided in this section to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In aspects set forth herein, and at a high level, the technology described herein may include generating vector (s) from data (e.g., text, image(s), video(s), etc.) using model(s) (e.g., artificial intelligence/machine learning (AI/ML) models) that apply one or more first processes to the data and transmitting the vector(s) via a telecommunications network rather than transmitting the data itself. The data may be recovered from the vector(s) using model(s) that apply one or more second processes that reverse the one or more first processes applied to the data to generate the vector(s). An indication of the one or more first processes applied to the data may be provided with the transmission that includes the vector(s) or in a separate transmission. The model(s) used to generate the vector(s) and the model(s) used to recover the data may be implemented at a single point (e.g., with a device or a component of the telecommunications network) or in a distributed manner (e.g., with multiple devices and/or components of the telecommunications network). The techniques described herein provide various implementations for reduced bandwidth communications that may improve performance for high-bandwidth and ultra-low latency uses cases.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
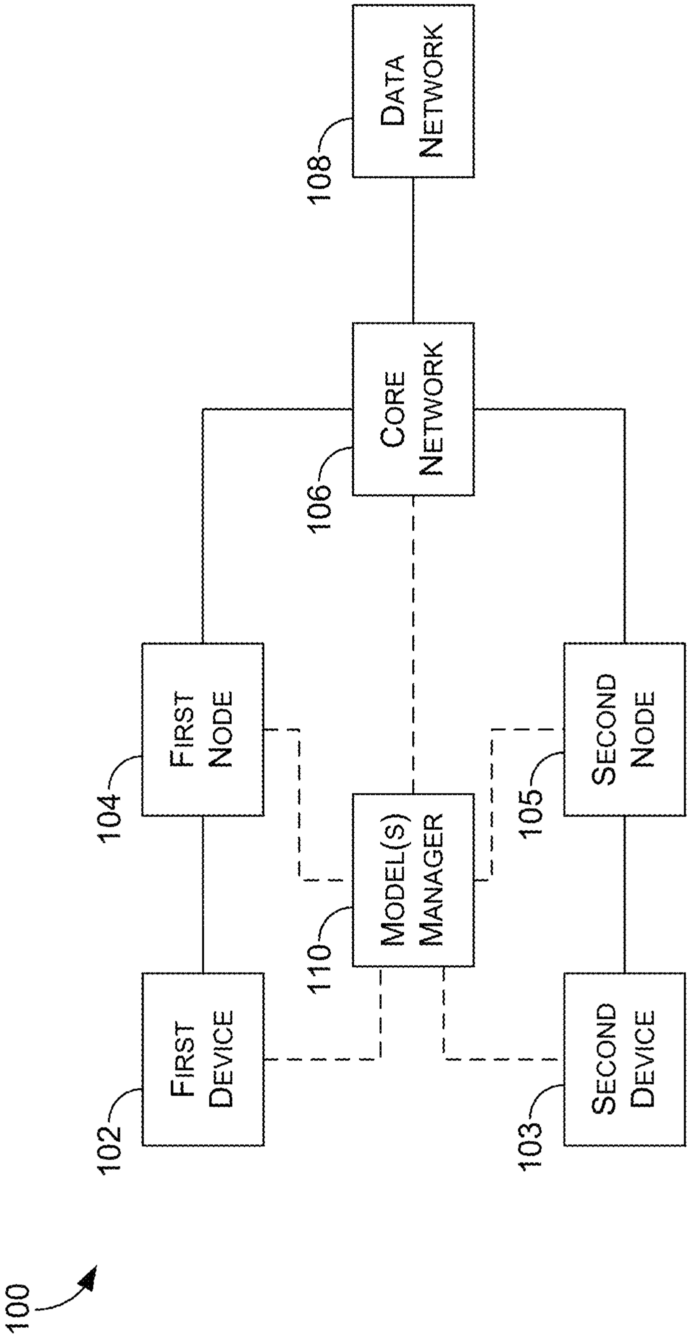
FIG. 1 is a diagram illustrating an example network environment for use in accordance with aspects herein.

The subject matter of embodiments of the present disclosure is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

By way of background, mobile network operators are in the process of preparing for the move to sixth generation (6G) wireless communications networks. 6G is anticipated to enable more immersive and interactive experiences compared to 5G by supporting a variety of new use cases (e.g., augmented reality (AR), virtual reality (VR), holographic communications, and the like), which require very high-bandwidth and ultra-low latency. There are still significant challenges facing the mobile network operators, and the industry as a whole, related to supporting these high-bandwidth and ultra-low latency use cases in manner that is cost-effective, sustainable, and energy efficient.

The industry is currently researching different frequency spectrum allocations that may provide the greater bandwidth and lower latency to implement 6G use cases. For example, the cmWave range (e.g., 7-15 GHz) is being considered due to the relatively high capacity and coverage it may provide, and the sub-THz range (90-300 GHz) is also being considered due to the extremely high data rates and wide bandwidth it may provide. While the cmWave range may provide sufficient capacity and coverage for some 6G uses cases, it may not provide sufficient data rates or bandwidth for particularly high-bandwidth and ultra-low latency use cases. Further, while the sub-THz range may provide very high data rates and a large amount of bandwidth, the signal attenuation of the sub-THz range signals will necessitate deployment of a large number of smaller cells to provide adequate coverage, which may be prohibitively expensive for mobile network operators.

Unlike conventional solutions, the present disclosure is directed to techniques for reduced bandwidth communication that may include generating vector(s) from data (e.g., text, image(s), video(s), etc.) using first model(s) that apply one or more first processes to the data to and transmitting the vector(s) via a telecommunications network. The data may be recovered from the vector(s) using second model(s) that apply one or more second processes to the vector(s). The one or more second processes reverse the one or more first processes used to generate the vector(s). The first model(s) and second model(s) may be implemented using AI/ML models. In some embodiments, an indication of the one or more first processes applied to the data is provided and the one or more second processes are selected based on the indication. By using the techniques described herein, a telecommunications network may natively support AI-based communications in a manner that reduces the bandwidth and latency for transmissions such that the high-bandwidth and ultra-low latency use cases may be implemented at lower frequency bands.

In one aspect, an apparatus is provided. The apparatus includes one or more processors and one or more computer-readable media storing computer-usable instructions that, when executed by the one or more processors, cause the one or more processors to perform a method. The method includes generating one or more first vectors from the first data using one or more first models that apply one or more first processes to the first data. The method also includes transmitting the one or more first vectors to a first component of a telecommunications network. Further, the method includes providing an indication of the one or more first processes applied by the one or more first models to the first data.

In another aspect, an apparatus is provided. The apparatus includes one or more processors and one or more computer-readable media storing computer-usable instructions that, when executed by the one or more processors, cause the one or more processors to perform a method. The method includes receiving one or more vectors from a component of a telecommunications network. The method also includes receiving an indication of one or more first processes applied by one or more first models used to generate the one or more vectors from data. Further, the method includes recovering the data from the one or more vectors using one or more second models that apply one or more second processes to the one or more vectors, wherein the one or more second processes reverse the one or more first processes applied by the one or more first models used to generate the one or more vectors from the data.

In yet another aspect, a method is provided. The method includes receiving data from a first device. The method further includes generating, with one or more first components of a telecommunications network, one or more vectors from the data using one or more first models. The one or more first models apply one or more first processes to the data. The method also includes transmitting the one or more vectors via the telecommunications network. Further, the method includes recovering, with one or more second components of the telecommunications network, the data from the one or more vectors using one or more second models. The one or more second models apply one or more second processes that reverse the one or more first processes applied to the data to generate the one or more vectors. The method further includes transmitting the data to a second device.

In yet another aspect, a system is provided. The system includes one or more components of a telecommunications network configured to generate one or more vectors from data using one or more first models that apply one or more first processes to the data. The data is received from a first device. The system also includes a second device configured to receive the one or more vectors from the telecommunications network and to recover the data from the one or more vectors using one or more second models that apply one or more second processes.

In yet another aspect, a system is provided. The system includes a first device configured to generate one or more vectors from data using one or more first models that apply one or more first processes to the data and to transmit the one or more vectors via a telecommunications network. The system further includes one or more components of the telecommunications network configured to recover the data from the one or more vectors using one or more second models that apply one or more second processes to the one or more vectors and to transmit the data from the first device to a second device.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

As used herein, the term "base station" (used for providing UEs with access to the telecommunication services) or "node" generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like.

A "user device," as used herein, is a device that has the capability of using a wireless communications network, and may also be referred to as a "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to the first device 102 described herein with respect to FIG. 1. A user device may also be, in another embodiment, similar to the computing device 500, described herein with respect to FIG. 5.

A user device may additionally include internet-of-things devices, such as one or more of the following: a sensor, controller (e.g., a lighting controller, a thermostat, etc.), appliances (e.g., a smart refrigerator, a smart air conditioner, a smart alarm system, etc.), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

A "Fixed Wireless Access (FWA) device," as used herein, is a device that is part of an FWA system, which includes the base station (or access point) and the FWA device. The FWA device is installed at the user's premises. It communicates wirelessly with the base station to provide internet connectivity to the end-user devices, such as computers, smartphones, smart TVs, and other internet-enabled devices within the premises. The FWA device serves as the intermediary between the user's internal network and the base station. It receives data from the base station and transmits it to the user's devices and vice versa. For optimal performance, FWA devices are usually installed in locations with clear line-of-sight to the base station, such as rooftops or external walls.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Turning to FIG. 1, FIG. 1 is a diagram illustrating an example network environment 100 in which aspects of the techniques for reduced bandwidth communications described herein may be implemented. Such a network environment is illustrated and designated generally as network environment 100. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

As shown in FIG. 1, network environment 100 comprises a first device 102, a second device 103, a first node 104, a second node 105, a core network 106, a data network 108, and a model(s) manager 110. It should be noted that although a particular number of devices and nodes are shown in FIG. 1, the network environment 100 may include a different number of devices and/or nodes. More or fewer components are possible and contemplated, including in consolidated or distributed form.

The first device 102 and the second device 103 may comprise a user device or a FWA device. The first device 102 and the second device 103 may comprise any device employed by an end-user to communicate with a telecommunications network, such as a wireless telecommunications network. The first device 102 and the second device 103 may, in general, comprise forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, the first device 102 and the second device 103 may include computing devices such as, but not limited to, handheld personal computing devices, cellular phones, smartphones, tablets, laptops, and similar consumer equipment, or stationary desktop computing devices, workstations, servers and/or network infrastructure equipment. As such, the first device 102 and the second device 103 may be mobile UEs or stationary UEs. The first device 102 and the second device 103 may include one or more processors, and one or more non-transient computer-readable media for executing code to carry out the functions of the first device 102 and the second device 103 described herein. The computer-readable media may include computer-readable instructions executable by the one or more processors. In some embodiments, the first device 102 and the second device 103 may be implemented using a computing device 500 as discussed below with respect to FIG. 5.

Nodes, such as the first node 104 and the second node 105, are often individually referred to as a radio access network (RAN) and/or a wireless communication base station system. In the embodiment shown in FIG. 1, the first node 104 may function as an access node via which the first device 102 within coverage area of the first node 104 can wirelessly access services of the core network 106, such as telecommunications and data connectivity. Similarly, the second node 105 may function as an access node via which the second device 103 within coverage area of the second node 105 can wirelessly access services of the core network 106, such as telecommunications and data connectivity.

In the context of 4G LTE, the first node 104 and the second node 105 may be referred to as eNodeBs, or eNBs. In the context of 5G NR, the first node 104 and the second node 105 may be referred to as gNodeBs, or gNBs. Nodes may be terrestrial or extraterrestrial. Other terminology may also be used depending on the specific implementation technology. As such, in some embodiments, the network environment 100 comprises, at least in part, a wireless communications network, such as the core network 106, which communicates with the data network 108.

In some embodiments, the first node 104 and/or the second node 105 may comprise a multi-modal network (for example comprising one or more multi-modal access devices) where multiple radios supporting different systems are integrated into the radio of the node. Such a multi-modal RAN may support a combination of 3GPP radio technologies (e.g., 4G, 5G and/or 6G) and/or non-3GPP radio technologies.

The core network 106 may be a component of a wireless communications network that provides one or more wireless network services to one or more devices (e.g., the first device 102 and the second device 103) within the coverage areas of a plurality of nodes, including the first node 104 and the second node 105. In particular, the core network 106 provides combinations of network services to the devices 102 and 103 for at least one public land mobile networks (PLMNs) that the devices 102 and 103 may attach to via channels of one or more RF bands (referred to herein as RF band layers).

The network environment 100 is generally configured for wirelessly connecting the devices 102 and 103 to other devices via first node 104 and the second node 105, via other RAN and/or other local wireless cellular access points, and/or via other telecommunications networks or a public switched telephone network (PSTN), for example. The network environment 100 may be generally configured, in some embodiments, for wirelessly connecting the devices 102 and 103 to data or services that may be accessible on one or more application servers or other functions, nodes, or servers (such as services provided by servers of the data network 108, for example). The data network 108, in aspects, may be private data networks or a public data networks (e.g., the Internet).

As will be discussed further herein, the first device 102, the second device 103, and/or component(s) of the telecommunications network (e.g., the first node 104, the second node 105, and/or the components of the core network 106) may include one or more models that generate one or more vectors from data or recover data from one or more vectors transmitted via the telecommunications network. The model(s) manager 110 may manage the different models that reside on the devices 102 and 103, the nodes 104 and 105, and the components of the core network 106. The model(s) manager 110 may distribute the models to the different components within the network environment 100 and receive information back from the different components within the network environment 100 regarding which version of a particular model resides on the components. The model(s) manager 110 may control which models are utilized within the network environment 100, where the models are distributed within the network environment 100, and provide this information to the core network 106 and/or other components within the network environment 100 such that compatible chains for particular communication links are utilized.

Figure 2:
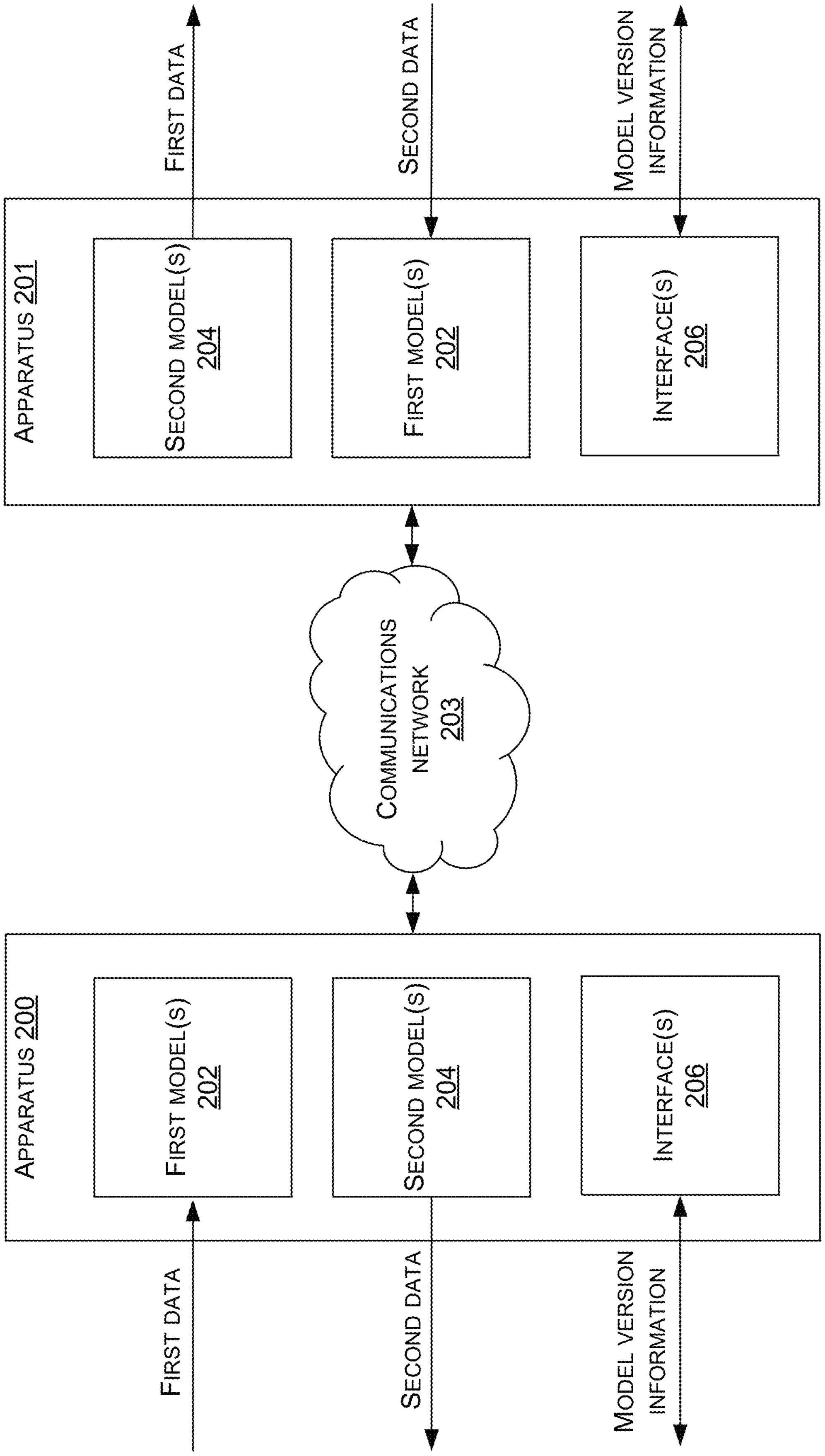
FIG. 2 is a block diagram illustrating example apparatuses, in accordance with aspects herein.

Referring now to FIG. 2, FIG. 2 is a block diagram illustrating example apparatuses 200 and 201 for use in implementations of the present disclosure. In some embodiments, the first apparatus 200 and the second apparatus 201 may comprise the first device 102 and the second device 103 shown in FIG. 1. However, the first apparatus 200 and the second apparatus 201 may also comprise other apparatuses within the network environment 100 (including apparatuses not explicitly shown in FIG. 1). For example, the first apparatus 200 and the second apparatus 201 may comprise user devices, FWA devices, host devices (e.g., communicatively coupled to other devices via the data network 108), or components of a telecommunications network (e.g., the nodes 104 and 105 or a component of the core network 106). The first apparatus 200 and the second apparatus 201 may communicate via the communications network 203, which includes at least some components of the telecommunications network (e.g., the nodes 104 and 105 and the core network 106.

In the example shown in FIG. 2, the first apparatus 200 includes first model(s) 202 and second model(s) 204. The first apparatus 200 is configured to transmit first vector(s) to the second apparatus 201 via the communications network 203. The first data may include text, image(s), video(s), prompt(s), and other types of data. While the first apparatus 200 is shown as receiving the first data (e.g., from another apparatus) and transmitting the second data (e.g., to another apparatus), it should be understood that this is for ease of explanation. The first apparatus 200 may generate the first data (e.g., based at least on one or more prompts) or retrieve the first data that is stored (e.g., in a storage media) on the first apparatus 200, and the first apparatus 200 may consume the second data without transmitting it to another apparatus.

In the example shown in FIG. 2, the second apparatus 201 also includes first model(s) 202 and second model(s) 204. The second apparatus 201 is configured to transmit second data (represented by the second vector(s)) to the first apparatus 200. The second data may include text, image(s), video(s), and other types of data. While the second apparatus 201 is shown as receiving the second data (e.g., from another apparatus) and transmitting the first data (e.g., to another apparatus), it should be understood that this is for ease of explanation. The second apparatus 201 may generate the second data (e.g., based at least on one or more prompts) or retrieve the second data that is stored (e.g., in a storage media) on the second apparatus 201 and the second apparatus 201 may consume the first data without transmitting it to another apparatus.

The first model(s) 202 of the first apparatus 200 may generate the first vector(s) from the first data by applying one or more first processes to the first data prior to transmission to the second apparatus 201. The first apparatus 200 transmits the first vector(s) to the second apparatus 201 via the communications network 203 instead of transmitting the first data. The second apparatus 201 may recover the first data from the first vector(s) using the second model(s) 204. The second model(s) 204 of the second apparatus 201 may apply one or more second processes to the first vector(s) that reverse the one or more first processes that were applied by the first model(s) 202 of the first apparatus 200 such that the first data may be recovered.

Similarly, the first model(s) 202 of the second apparatus 201 may generate the second vector(s) from the second data by applying one or more first processes to the second data prior to transmission to the first apparatus 200. The second apparatus 201 transmits the second vector(s) to the first apparatus 200 via the communications network 203 instead of transmitting the second data. The first apparatus 200 may recover the second data from the second vector(s) using the second model(s) 204. The second model(s) 204 of the first apparatus 200 may apply one or more second processes to the second vector(s) that reverse the one or more first processes that were applied by the first model(s) 202 of the second apparatus 201 such that the second data may be recovered.

The first model(s) 202 may be implemented with an artificial intelligence/machine learning (AI/ML) model or a combination of AI/ML models that apply one or more processes to data to generate one or more vectors. The first model(s) 202 may comprise an encoder of a variational autoencoder (VAE) that maps data to a distribution within a latent space, which may be represented as one or more vectors. The first model(s) 202 may also comprise a forward diffusion model that gradually (e.g., iteratively) adds noise (e.g., Gaussian noise) to data (e.g., an image) until the data becomes noise, which may be represented with one or more noise vectors. The first model(s) 202 may also comprise a text-to-vector model that converts text (e.g., a word, token, partial word, etc.) to a number index, which maps to one or more vectors. It should be understood that other AI/ML models or combinations of AI/ML models may also be used to implement the first model(s) 202 depending on the type of data to be transmitted, the processing capabilities of the apparatuses 200 and 201, and the like.

The second model(s) 204 may also be implemented with an AI/ML model or a combination of AI/ML models that apply one or more second processes to the first vector(s), which reverse (or otherwise undo) the one or more first processes applied by the first model(s) 202 to recover the data. For example, the second model(s) 204 apply the inverse/reverse operations of the first model(s) 202. The second model(s) 204 may comprise a decoder of a VAE, which maps the distribution within the latent space to data. The second model(s) 204 may also comprise a reverse diffusion model that gradually (e.g., iteratively) removes noise from one or more noise vectors. The second model(s) 204 may also comprise a vector-to-text model that maps the vectors to a number index and converts the number index to text. It should be understood that other AI/ML models or combinations of AI/ML models may also be used to implement the second model(s) 204 depending on the type of data to be transmitted, the processing capabilities of the apparatuses 200 and 201, and the like.

In some embodiments, the first model(s) 202 and/or the second model(s) 204 may be implemented with AI/ML models that are designed for particular applications to potentially limit the number of parameters required for applying the one or more processes. For example, the first model(s) 202 and/or the second model(s) 204 may be implemented with AI/ML models (e.g., small language models) that have a smaller number of parameters compared to, e.g., large language models.

The first model(s) 202 implemented by the first apparatus 200 may be the same as the first model(s) 202 implemented by the second apparatus 201. Similarly, the second model(s) 204 implemented by the first apparatus 200 may be the same as the second model(s) 204 implemented by the second apparatus 201. However, in some embodiments, the first model(s) 202 implemented by the first apparatus 200 may be different than the first model(s) implemented by the second apparatus 201, and the second model(s) 204 implemented by the first apparatus 200 may be different than the second model(s) 204 implemented by the second apparatus 201.

The first apparatus 200 and the second apparatus 201 each include one or more interfaces 206, which may be used to communicate model version information for the first model(s) 202 and the second model(s) 204 with the model(s) manager 110. The first apparatus 200 and second apparatus 201 may receive the version of the first model(s) 202 and/or the second model(s) 204 from the model(s) manager 110 that are to be used for a particular period of time via the interface(s) 206. The model version information provided by the model(s) manager 110 to the first apparatus 200 and the second apparatus 201 may provide an indication of the one or more processes applied by the first model(s) to generate the first vector(s) and the second vector(s).

In some embodiments, the first apparatus 200 and the second apparatus 201 install the version of the first model(s) 202 and/or second model(s) 204 received from the model(s) manager 110 and report back to the model(s) manager 110 when the installation has been completed, and the report by the first apparatus 200 and the second apparatus 201 may provide an indication of the one or more processes applied by the first model(s) to generate the first vector(s) and the second vector(s). In this way, the model(s) manager 110 may have a record of the versions of the first model(s) 202 and the second model(s) 204 that are installed on individual apparatuses and attempt to synchronize the first model(s) 202 and the second model(s) 204 used by apparatuses communicating via the telecommunications network. If particular apparatuses communicating via the telecommunications network aren't able to install or implement the first model(s) 202 and/or second model(s) 204 (e.g., due to a lack of computing resources), the model(s) manager 110 may make components of the telecommunications network aware of this, and the processes to generate the vector(s) from data or to recover data from vector(s) may be adapted or performed by other apparatuses on behalf of the particular apparatuses.

Thus, while the first model(s) 202 and the second model(s) 204 are shown as being contained in a single apparatus (e.g., the first apparatus 200 and the second apparatus 201), it should be understood that the first model(s) 202 and/or the second model(s) 204 may be distributed amongst multiple apparatuses for a particular communication link. For example, for communicating the first data from the first apparatus 200 to the second apparatus 201, the first model(s) 202 may be distributed between the first apparatus 200 and at least a third apparatus between the first apparatus 200 and the second apparatus 201. Similarly, the second model(s) 204 may be distributed between the second apparatus 201 and at least a fourth apparatus between the third apparatus and the second apparatus 201. In other words, the generation of the vector(s) from the data using the first model(s) and the recovery of the data from vector(s) using the second model(s) 204 may be distributed amongst multiple apparatuses in some implementations.

In some embodiments, the routing of the transmissions that include the first vector(s) or the second vector(s) may be based, at least in part, on the capabilities of the devices that are sending the first data or second data (e.g., source devices) and receiving the first data or second data (e.g., receiving devices). For example, if the source device is a user device with limited processing capability that does not include the first model(s) 202, then the transmission of the first data by that source device may be routed to/through the first apparatus 200 (e.g., devices, nodes, core network elements, etc.) that includes the first model(s) 202 such that the first vector(s) may be generated from the first data at some point in the communication after the first data is transmitted by the source device. Similarly, if the receiving device is a user device with limited processing capability that does not include the second model(s) 204, then the transmission of the vector(s) may be routed to/through the second apparatus 201 (e.g., devices, nodes, core network elements, etc.) that includes the second model(s) 204 such that the first data may be recovered from the vector(s) at some point in the communication prior to being received by the receiving device. By routing the transmission to/through the first apparatus 200 and the second apparatus 201, the required transport capacity through the communications network 203 to communicate the first data may be reduced even if the source device and/or the receiving device do not include sufficient processing capabilities to implement the first model(s) 202 and/or the second model(s) 204.

Figure 3:
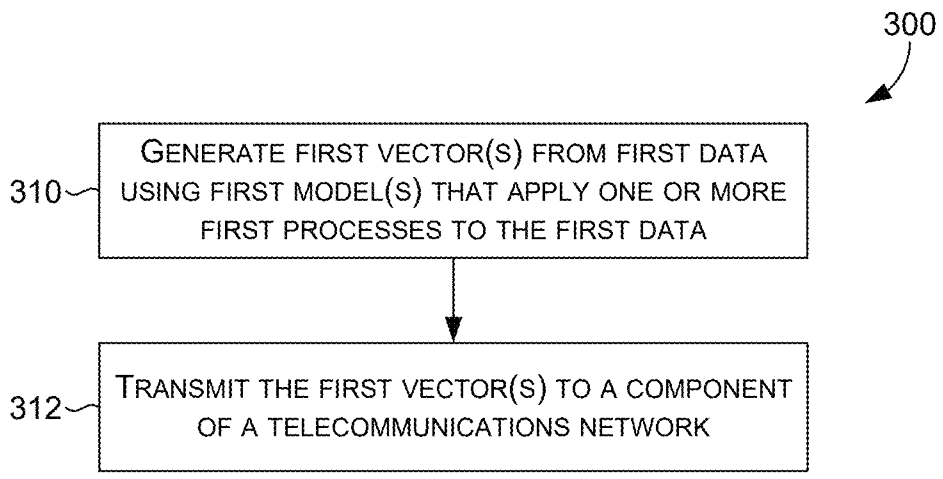
FIG. 3 is a flow chart illustrating an example method for reduced bandwidth communications, in accordance with aspects herein.

Referring to FIG. 3, an example method 300 is provided for reduced bandwidth communications, in accordance with some embodiments of the present disclosure. It should be understood that the features and elements described herein with respect to the method 300 of FIG. 3 may be used in conjunction with, in combination with, or substituted for elements of, any of the other embodiments discussed herein and vice versa. Further, it should be understood that the functions, structures, and other descriptions of elements for embodiments described in FIG. 3 may apply to like or similarly named or described elements across any of the figures and/or embodiments described herein and vice versa. In some embodiments, the method 300 is performed by the first apparatus 200 or the second apparatus 201 described above with respect to FIG. 2.

At block 310, first vector(s) are generated from first data using first model(s) that apply one or more first processes to the first data. The first data may be received from another apparatus, retrieved from a storage media of the apparatus, or generated by the apparatus. The first model(s) may comprise AI/ML models including, but not limited to, VAE encoders, forward diffusion models, and/or text-to-vector models. The particular first model(s) utilized may vary depending on the type of data that the first data includes, the processing capabilities of the apparatus, and the like. In some embodiments, the first model(s) apply the one or more first processes to the first data to generate noise vectors.

At block 312, the first vector(s) are transmitted to a component of a telecommunications network. The first vector(s) may be transmitted over a wired or wireless communication link. Additional processing of the first vector(s) may be performed prior to transmission and the particular additional processing depends on the type of apparatus that is implementing the first model(s). For example, if the apparatus is a user device, then the additional processing may include encoding, modulating, upconverting, and other processing associated with wireless transmission by a user device. In some embodiments, the transmission that includes the first vector(s) also includes an indication of the one or more first processes applied to the first data to generate the first vector(s) (e.g., in a header for the transmission).

Figure 4:
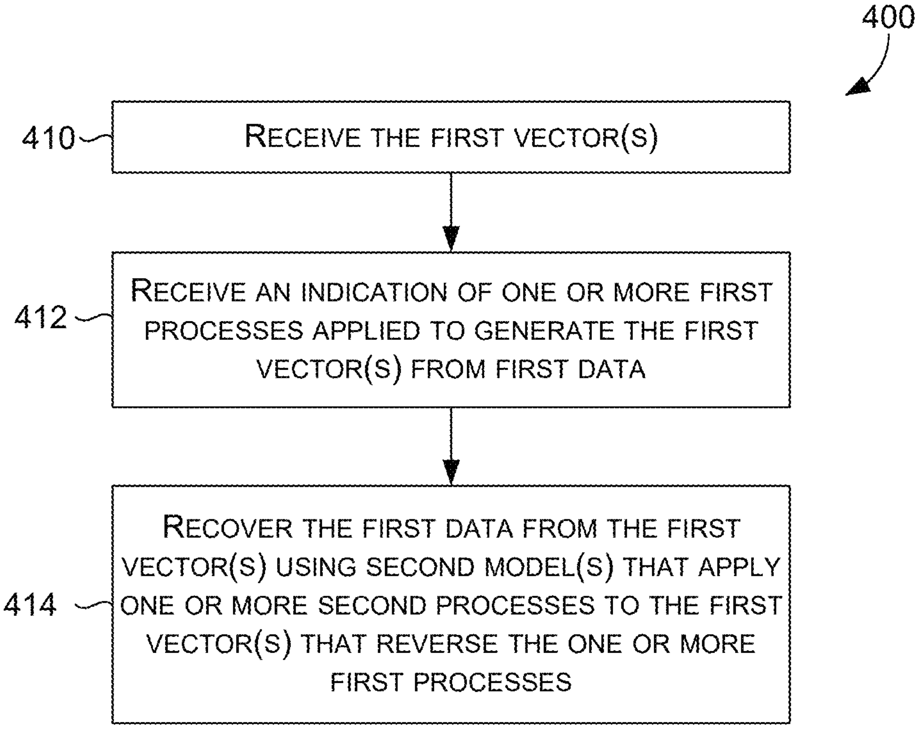
FIG. 4 is flow chart illustrating an example method for reduced bandwidth communications, in accordance with aspects herein.

Referring to FIG. 4, another example method 400 is provided for reduced bandwidth communications, in accordance with some embodiments of the present disclosure. It should be understood that the features and elements described herein with respect to the method 400 of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa. In some embodiments, the method 400 is performed by the first apparatus 200 or the second apparatus 201 described above with respect to FIG. 2.

At block 410, the first vector(s) are received. The first vector(s) may be received via a wired or wireless communication link. In some embodiments, reception of the first vector(s) includes processing of the received communication signals. The particular processing depends on the type of apparatus that received the first vector(s). For example, if the apparatus is a user device, then the processing may downconverting, demodulating, decoding, and other processing associated with wireless reception by a user device.

At block 412, an indication of one or more first processes of the first model(s) applied to generate the first vector(s) from first data is received. The indication of the one or more first processes of the first model(s) used to generate the first vector(s) may be received separately from the transmission that includes the first vector(s) (e.g., from a model(s) manager 110 described above with respect to FIGS. 1-2). In some embodiments, the indication of the one or more first processes of the first model(s) applied to generate the first vector(s) from the first data may be included in the same transmission that includes the first vector(s) (e.g., in a header for the transmission).

At block 414, the first data is recovered from the first vector(s) using second model(s) that apply one or more second processes to the first vector(s) that reverse (or otherwise undo) the one or more first processes. In some embodiments, the particular second model(s) used and the particular second processes applied to the first vector(s) are selected based on the received indication of the one or more first processes of the first model(s) used to generate the first vector(s). For example, an apparatus may have different types of second model(s) that may be used to recover the first data from the first vector(s), and the apparatus may select the particular second model(s) and/or second processes that correspond to (e.g., reverse or otherwise undo) the one or more first processes based the received indication.

Figure 5:
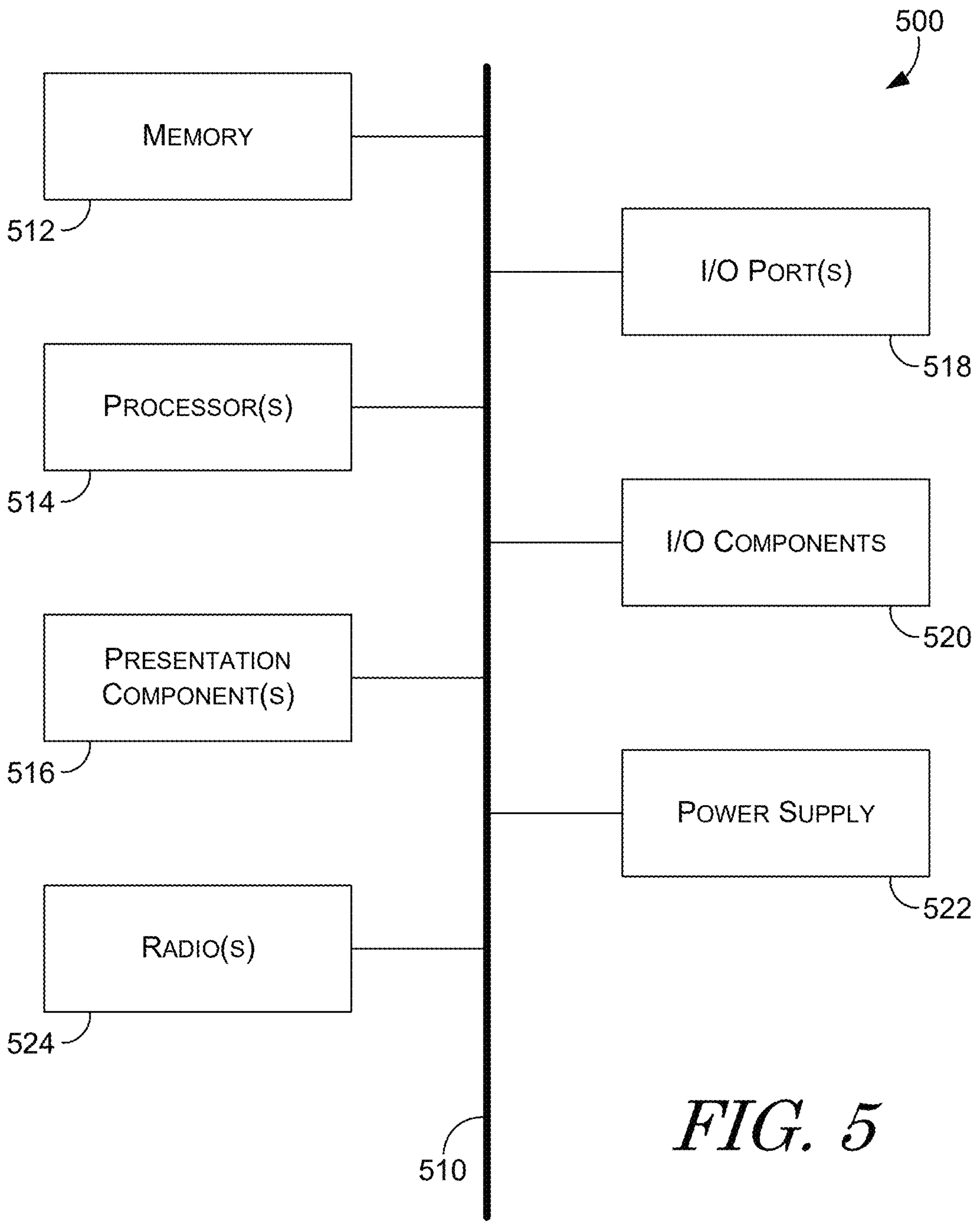
FIG. 5 is a diagram illustrating an example computing environment, in accordance with aspects herein.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the embodiments described herein. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, the computing device 500 includes bus 510 that directly or indirectly couples one or more of the following devices: memory 512, one or more processors 514, one or more presentation components 516, input/output (I/O) ports 518, I/O components 520, power supply 522, and radio 524. Bus 510 represents what may be one or more busses (such as an address bus, data bus, or combination thereof). The components of FIG. 5 are shown with lines for the sake of clarity. However, it should be understood that the functions performed by one or more components of the computing device 500 may be combined or distributed amongst the various components. For example, a presentation component such as a display device may be one of I/O components 520. In some embodiments, a base station, RAN and/or component of the core network implementing one or more aspects of an apparatus (e.g., apparatus 200 or apparatus 201) comprise a computing device 500. In some embodiments, the first device 102 or the second device 103 from FIG. 1 may comprise a computing device such as the computing device 500.

The processors of the computing device 500, such as the one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The computing device 500 typically includes a variety of computer-readable media. Computer-readable media can be any available non-transient media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable non-transient media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 512 includes tangible, non-transient, computer-storage media in the form of volatile and/or nonvolatile memory. The memory 512 may be removable, non-removable, or a combination thereof. Exemplary memory includes solid-state memory, hard drives, optical-disc drives, etc. The computing device 500 includes one or more processors 514 that read data from various entities such as the bus 510, the memory 512 or the I/O components 520. One or more presentation components 516 may present data indications to a person or other device. Exemplary one or more presentation components 516 include a display device, speaker, printing component, vibrating component, etc. The I/O ports 518 allow computing device 500 to be logically coupled to other devices including the I/O components 520, some of which may be built in the computing device 500. Illustrative I/O components 520 include a microphone, joystick, game pad, satellite dish, scanner, printer, wireless device, etc.

The radio(s) 524 represent a radio that facilitates communication with a wireless telecommunications network. For example, radio(s) 524 may be used to establish communications with a UE and/or a RAN. Illustrative wireless telecommunications technologies include CDMA, GPRS, TDMA, GSM, 4G LTE, 3GPP 5G, and other 3GPP technologies. The radio(s) 524 may additionally or alternatively facilitate other types of non-3GPP wireless communications including Wi-Fi, WiMAX, and/or other VoIP communications. In some embodiments, the radio(s) 524 may support multi-modal connections that include a combination of 3GPP radio technologies (e.g., 4G, 5G and/or 6G) and/or non-3GPP radio technologies. As can be appreciated, in various embodiments, the radio(s) 524 can be configured to support multiple technologies and/or multiple radios can be utilized to support multiple technologies. In some embodiments, the radio(s) 524 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. An apparatus, comprising:

one or more processors; and one or more computer-readable media storing computer-usable instructions that, when executed by the one or more processors, cause the one or more processors to:

generate one or more first vectors from first data using one or more first artificial intelligence/machine learning (AI/ML) models that apply one or more first processes to the first data;

transmit the one or more first vectors to a first component of a telecommunications network;

provide an indication of the one or more first processes applied by the one or more first AI/ML models to the first data;

receive one or more second vectors from the first component of the telecommunications network;

receive an indication of one or more second processes applied to second data by one or more second models used to generate the one or more second vectors; and recover second data from the one or more second vectors using one or more third models, wherein the one or more third models apply one or more third processes to the one or more second vectors that reverse the one or more second processes applied to the second data.

2. The apparatus of claim 1, wherein the computer-usable instructions, when executed by the one or more processors, further cause the one or more processors to select the one or more third models based on the indication of the one or more second processes applied to the second data by the one or more second models used to generate the one or more second vectors.

3. The apparatus of claim 1, wherein the one or more first processes comprise iteratively adding noise to the first data to generate one or more noise vectors.

4. The apparatus of claim 1, wherein the one or more first processes comprise converting the first data to a number index and converting the number index to the one or more first vectors.

5. The apparatus of claim 1, wherein the computer-usable instructions, when executed by the one or more processors, cause the one or more processors to provide the indication of the one or more first processes applied by the one or more first AI/ML models to generate the one or more first vectors from the first data in a transmission that includes the one or more first vectors.

6. The apparatus of claim 1, wherein the apparatus is configured to receive the first data from a device.

7. The apparatus of claim 1, wherein the apparatus is configured to generate the first data based at least on one or more prompts.

8. An apparatus, comprising:
one or more processors; and
one or more computer-readable media storing computer-usable instructions that, when executed by the one or more processors, cause the one or more processors to:
receive one or more vectors from a component of a telecommunications network;
receive an indication of one or more first processes applied by one or more first artificial intelligence/machine learning (AI/ML) models used to generate the one or more vectors from data;
select one or more second models that apply one or more second processes to the one or more vectors based on the indication of the one or more first processes applied by the one or more first AI/ML models used to generate the one or more vectors from the data; and
recover the data from the one or more vectors using the one or more second models that apply the one or more second processes to the one or more vectors, wherein the one or more second processes reverse the one or more first processes applied by the one or more first AI/ML models used to generate the one or more vectors from the data.

9. The apparatus of claim 8, wherein the one or more second processes include converting the one or more vectors to a number index and converting the number index to the data.

10. The apparatus of claim 8, wherein the one or more second processes include removing noise from the one or more vectors to recover the data.

11. The apparatus of claim 8, wherein the one or more second models comprise AI/ML models.

12. The apparatus of claim 8, wherein the indication of the one or more first processes applied by the one or more first AI/ML models used to generate the one or more vectors from the data is received separately from a transmission that includes the one or more vectors.

13. The apparatus of claim 8, wherein the computer-usable instructions, when executed by the one or more processors, further cause the one or more processors to transmit the data to a device.

14. A method, comprising:
receiving data from a first user device;
generating, with one or more first components of a telecommunications network distinct from the first user device, one or more vectors from the data using one or more first artificial intelligence/machine learning (AI/ML) models that apply one or more first processes to the data;
transmitting the one or more vectors via the telecommunications network;
recovering, with one or more second components of the telecommunications network distinct from the first user device and the one or more first components of the telecommunications network, the data from the one or more vectors using one or more second models, wherein the one or more second models apply one or more second processes that reverse the one or more first processes applied to the data to generate the one or more vectors; and
transmitting the data to a second user device.

15. The method of claim 14, wherein the one or more first processes comprise iteratively adding noise to the data to generate one or more noise vectors, wherein the one or more second processes comprise removing noise from the one or more vectors to recover the data.

16. The method of claim 14, wherein the one or more first components of the telecommunications network and/or the one or more second components of the telecommunications network comprise a base station.

17. The method of claim 14, wherein the one or more first components of the telecommunications network and/or the one or more second components of the telecommunications network comprise a component of a core network.

18. The method of claim 14, wherein the one or more second models comprise AI/ML models.

* * * * *